Merrill P. Robinson
Joseph F. Sebald
INVENTORS

Sept. 26, 1950     M. P. ROBINSON ET AL     2,523,523
APPARATUS FOR WATER PURIFICATION Filed Nov. 22, 1946     2 Sheets-Sheet 2

Merrill P. Robinson
Joseph F. Sebald
INVENTORS

BY *Robt Meyer*
*attorney*

Patented Sept. 26, 1950

2,523,523

UNITED STATES PATENT OFFICE 2,523,523

APPARATUS FOR WATER PURIFICATION

Merrill P. Robinson, Upper Montclair, and Joseph F. Sebald, Bloomfield, N. J., assignors to Worthington Pump and Machinery Corporation, Harrison, N. J., a corporation of Delaware Application November 22, 1946, Serial No. 711,628

2 Claims. (Cl. 210—16)

This invention relates to water treatment or purification and more particularly to an apparatus for the treatment of water by what is known as the cold lime-soda treatment.

More specifically the invention relates to what is known in the art as a precipitating softener of the cold process slurry type wherein suitable chemical reagents are added to the water to precipitate foreign matter into what is known as floc, and wherein the precipitate is agitated in upward flowing water through the settling chamber, causing the floc to concentrate in the upper portion of the settling tank and form a floating contact filter, where any unspent chemical reagents will be utilized.

In water purification systems of this type it is often necessary or desirable to filter the treated water, after leaving the precipitating softener, through a filter of any approved type containing a suitable filter bed. These filter beds must be washed or cleaned periodically to remove accumulated foreign matter and the present invention relates specifically to means for washing such filter beds by the reversal of the flow of water therethrough. The filter wash water is taken from the precipitating softener for purposes of convenience and economy and also to provide cleansing of the filter by treated water.

An object of the present invention is to provide, in a water treating apparatus of the precipitating slurry cold process type, a wash water compartment which receives water from the settling chamber of the apparatus, and maintains or stores a supply of water free of chemical precipitation and other turbidities, sufficient to back-wash the filter beds, together with means for returning the water from the back-washing operation to said wash water compartment, and an apparatus wherein the precipitated floc which enters the wash water compartment will settle out of the water and return to the settling chamber of the apparatus and pass with the normal flow of other precipitated floc to the floating contact filter bed at the top of the settling chamber.

With these and other objects in view, as may appear from the accompanying specification, the invention consists of various features of construction and combination of parts, which will be first described in connection with the accompanying drawings, showing an apparatus for water purification of a preferred form embodying the invention, and the features forming the invention, will be specifically pointed out in the claims.

Figure 1:
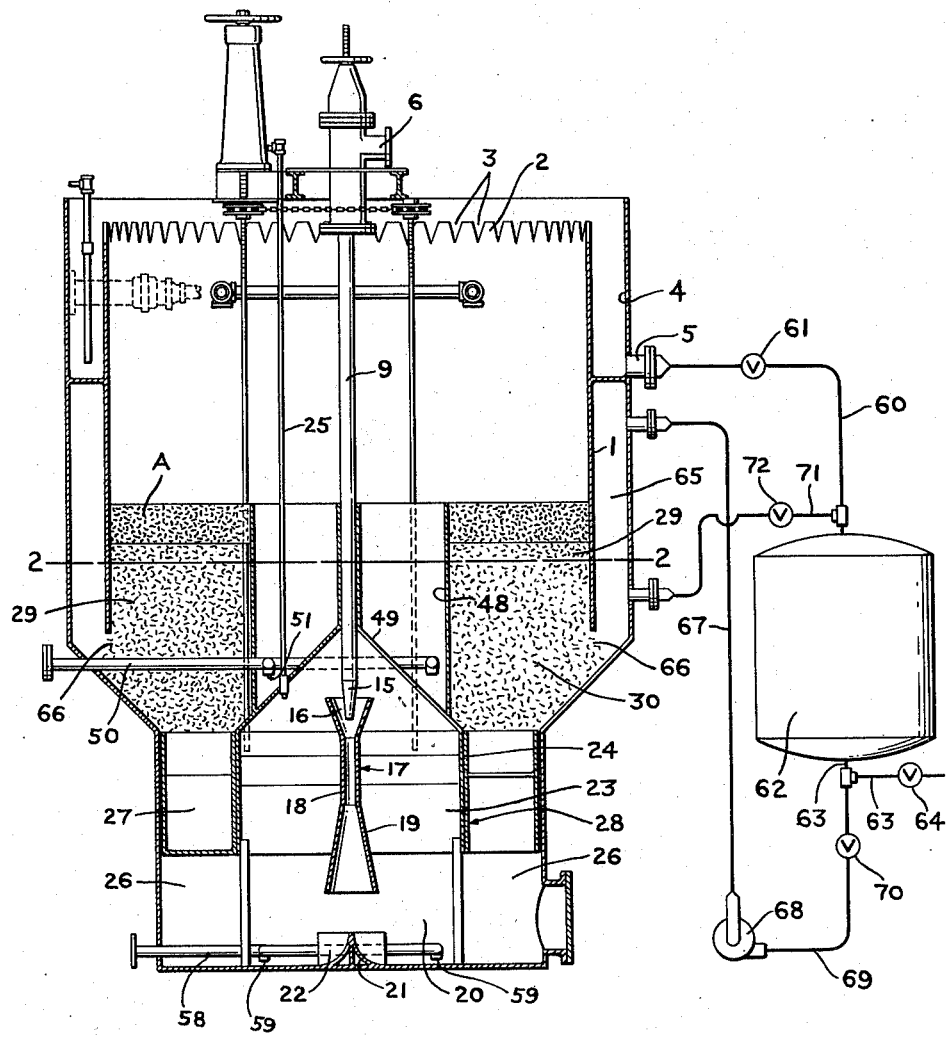
Figure 1 is a view partly in section and partly in elevation of one form of the invention.
Figure 2:
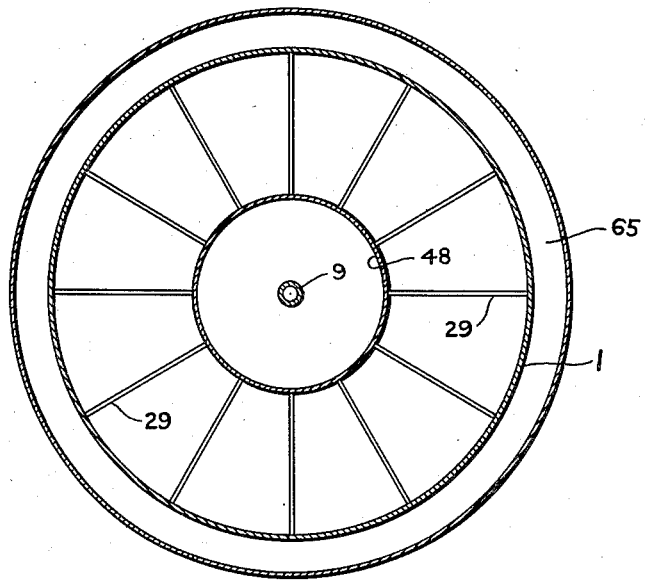
Figure 2 is a horizontal section taken on line 2—2 of Figure 1.

Referring more particularly to the drawings, a cold process slurry type precipitating water treating apparatus of the type shown and described in co-pending application Serial Number 670,396, now Patent Number 2,502,349, March 28, 1950, is illustrated in the drawings but it is to be understood that the invention is not to be limited to the particular construction of water treating apparatus shown, but may be incorporated in any construction of cold process, slurry type precipitating water treating apparatus without departing from the spirit of the present invention.

The water treating or softening apparatus includes a substantially cylindrical receptacle 1 which opens at its top through a weir 2 formed by a series of annularly spaced notches 3 into the treated water storage space 4 from which the water after treatment is drawn off for use through the outlet 5.

Raw water to be treated enters the apparatus through the raw water inlet 6 into the water inlet nozzle 9.

The lower end of the nozzle 9 has a discharge tip 15 thereon which discharges into the upper flared end 16 of an eductor 17. The upper flared end 16 of the eductor 17 has its outlet opening into the cylindrical connecting portion 18 which in turn discharges into the small inlet end of the downwardly and outwardly flaring outlet 19 of the eductor 17.

The eductor 17 discharges the raw water into the primary mixing chamber 20 formed centrally within the receptacle 1 at the bottom of the receptacle and against a plurality of arcuate impingement baffles 21 arranged so as to impart rotational flow to the liquid discharged from the eductor. The baffles 21 are arranged and connected to form the impingement baffle structure or unit 22.

The nozzle 15 discharging into the flaring upper end 16 of the eductor 17 will provide an eduction action causing a circulation of water and precipitated floc in the circulation chamber 23 formed by the annular portion 24 which is located axially within the receptacle 1 directly above the mixing chamber 20. The chemical reagent is fed into the circulating chamber 23 through the inlet nozzle structure 25 so that the induced action of the water will cause a through mixing and circulation of the water and the chemicals to cause precipitation of the foreign material into what is commonly known as floc. The circulation of the floc and some of the water through the eductor mixing chamber 20 and circulation chamber 23 will facilitate a precipitation of the foreign material in the mixture, increase the size of the floc particles and facilitate the purification of the water. The mixture of floc and water flows outwardly from the impingement baffle structure 22 into the primary recirculation and secondary mixing chamber 26 which is an annular chamber about the outside of the annular portion 24. The mixture flows upwardly through the primary recirculation and secondary mixing chamber 26 where it is engaged by flow directing vanes 27. The flow directing vanes 27 may be curved to impart rotary movement to the mixture of water and floc as it passes upwardly from the chamber 26. The rotative motion of the floc and water mixture reduces as the mixture passes upwardly through the settling chamber 30 and is finally stilled by a series of radially spaced settling baffles 29 which extend to the top, or approximately to the top of the floc bed indicated at A within the receptacle 1. As the upward rotary movement of the floc and water mixture reduces, the floc will congregate in the filtering floc bed A through which the water filters into the top of the receptacle 1 for flow therefrom into the treated water compartment 4.

A sludge settling compartment 48 is provided preferably centrally within the receptacle 1 directly above the primary circulation chamber 23 and the conical top 49 of the primary recirculation chamber 23 forms the bottom of the sludge settling compartment 48. The top of the sludge compartment 48 is open and is spaced at short distances above the top of the settling baffles 29 so that as the depth of the floc bed tends to increase it will flow over into the sludge settling compartment 48 from which it is withdrawn in a highly concentrated state through the sludge blow off pipe 50. The sludge blow off pipe 50 has a plurality of downwardly opening inlets 51 therein, which open downwardly into the lower portions of the sludge settling compartment 48 so that when the sludge blow off pipe is open the sludge will pass outwardly from the sludge settling compartment.

The separation of water from the floc is effected by the increased cross-sectional area of the tank or receptacle 1 directly above the floc bed and sludge settling compartment.

An auxiliary sludge flow off pipe 58 is mounted in the bottom of the mixing chamber 20 and it has a plurality of inlet connections indicated at 59 opening downwardly for removing concentrated sludge from the bottom of the receptacle 20.

The treated water flows from the treated water storage space 4 through a pipe 60, in which a valve 61 is mounted, through the filter 62 and out through the outlet pipe 63. A valve 64 is provided in the pipe 63. The filter 62 is of any approved type of filter containing a filter bed (not shown) of granular carbon or other suitable media, in which the last traces of the precipitate are deposited.

A wash water compartment 65 is formed around a part of the receptacle 1 and is open at its lower end through the opening or space 66 to the settling chamber 30 of the treating apparatus so that water may pass from the settling chamber into the wash water storage compartment 65.

The top of the wash water compartment 65 is closed and consequently when the compartment fills with water, the water will be quiescent therein and any floc or precipitated foreign matter which enters the compartment 65 will settle to the bottom thereof and pass out through the openings 66 into the settling chamber 30 where it will mix with the floc and water mixture moving upwardly in this settling chamber and finally congregate in floating filter bed A of floc.

A pipe 67 has communication with the wash water compartment 65 near its top with the suction of a pump 68. The pump 68 is of any approved type and its discharge is connected to the bottom of the filter 62 either direct or through the discharge pipe 63 by a pipe 69 in which a valve 70 is located.

A wash water outlet pipe 71 is connected to the top of the filter 62 either direct or through the inlet pipe 60 and with the wash water compartment 65 near the bottom of the compartment.

In normal operation of the filter 62 the valves 70 and 72 are closed and the valves 61 and 64 are open, and thus the treated water flows through the filter 62 and out the outlet pipe 63 to use.

When it is desired to wash the filter bed in the filter 62, the valves 61 and 64 are closed, the valves 70 and 72 are opened and the pump 68 is started. This pumps treated and settled water from the top of the wash water compartment through the filter 62 in a direction reversely to the normal flow direction of water through the filter, washing the filter bed, and returning the wash water to the bottom of the wash water compartment. The returned wash water passes through the opening 66 into the settling chamber 30. The wash water returned to the settling chamber 30 passes upwardly therethrough in mixture with the normal water flow, while such foreign matter as is contained in the part of the wash water remaining in the wash water compartment settles to the bottom of the compartment and passes into the settling chamber 30, passing upwardly therethrough to the floating filter bed A from which it passes into the floc chamber of space 48.

It will be understood that the invention is not to be limited to the specific construction or arrangement of parts shown, but that they may be widely modified within the invention defined by the claims.

What is claimed is:

1. A water treating apparatus including a receptacle having a water inlet and an outlet for treated water, a mixing chamber in said receptacle, means for delivering chemical reagent into the water in said mixing chamber to cause precipitation of foreign material into floc, a settling chamber in said receptacle above said mixing chamber in which floc separates out of the water solution and forms a floating filtering bed at the top of the settling chamber, a wash water storage compartment in said receptacle and about said settling chamber, said wash water storage compartment having its lower end opened to said settling chamber for receiving water therefrom and to permit precipitated floc to pass from the wash water compartment into the settling chamber.

2. A water treating apparatus including a receptacle having a water inlet and an outlet for treated water, a mixing chamber in said receptacle, means for delivering chemical reagent into the water in said mixing chamber to cause precipitation of foreign material into floc, a settling chamber in said receptacle and having communication with said mixing chamber to receive water and floc from the mixing chamber and in which the floc separates out of the water in solution and forms a floating filtering bed at the top of the settling chamber, a wash water storage compartment in said receptacle, said wash water storage compartment having its lower end opened to said settling chamber for receiving water therefrom and to permit precipitated floc to pass from the wash water compartment into the settling chamber.

MERRILL P. ROBINSON.
JOSEPH F. SEBALD.

REFERENCES CITED

The following references are of record in the file of this patent:

UNITED STATES PATENTS

| Number | Name | Date |
|---|---|---|
| 1,716,040 | Genter | June 4, 1929 |
| 2,263,398 | Robinson | Nov. 18, 1941 |
| 2,355,069 | Green | Aug. 8, 1944 |
| 2,378,799 | Sebald | June 19, 1945 |
| 2,379,753 | Sebald | July 3, 1945 |
| 2,391,697 | Green | Dec. 25, 1945 |
| 2,407,947 | Butcher | Sept. 17, 1946 |
| 2,464,617 | Sebald | Mar. 15, 1949 |